(12) United States Patent
English (10) Patent No.: US 8,281,752 B2
(45) Date of Patent: Oct. 9, 2012

(54) PACKAGE BOILER HAVING STEAM GENERATING UNITS IN TANDEM

(76) Inventor: John R. English, Hanover County, VA (US)

( * ) Notice: Subject to any disclaimer, the term of this patent is extended or adjusted under 35 U.S.C. 154(b) by 260 days.

(21) Appl. No.: 12/291,409

(22) Filed: Nov. 10, 2008

(65) Prior Publication Data
US 2011/0000445 A1    Jan. 6, 2011

Related U.S. Application Data

(60) Provisional application No. 61/002,505, filed on Nov. 10, 2007.

(51) Int. Cl.
F22B 15/00 (2006.01)
F22B 25/00 (2006.01)

(52) U.S. Cl. .......... 122/235.11; 122/235.15; 29/890.03; 29/890.051

(58) Field of Classification Search ............. 122/235.11, 122/235.15, 235.31, 235.34, 235.35; 29/890.03, 29/890.051
See application file for complete search history.

(56) References Cited

U.S. PATENT DOCUMENTS

| | | | |
|---|---|---|---|
| 2,187,632 A | 1/1940 | Shimer | |
| 2,322,390 A | 6/1943 | Rehm | |
| 2,763,243 A | 9/1956 | Marshall | |
| 2,823,651 A | 2/1958 | Marshall | |
| 2,988,063 A | 6/1961 | Yorkauf | |
| 3,174,464 A * | 3/1965 | Johnson | 122/235.11 |
| 3,266,467 A | 8/1966 | Winship | |
| 3,451,378 A * | 6/1969 | Burrus | 122/235.11 |
| 3,465,726 A | 9/1969 | Gerst | |
| 3,543,733 A | 12/1970 | Russo | |
| 3,608,525 A | 9/1971 | Sharan | |
| 3,971,345 A | 7/1976 | Csathy | |
| 4,262,637 A | 4/1981 | Weiner | |
| 5,558,047 A * | 9/1996 | Vetterick | 122/367.1 |
| 5,881,551 A | 3/1999 | Dang | |
| 6,901,887 B2 | 6/2005 | English | |

OTHER PUBLICATIONS

The Babcock & Wilcox Company, Steam/Its Generation and Its Use (40th ed.) (book), 1992, pp. 25-8 and 25-9.
Combustion Engineering, Inc., Combustion Fossil Power, (4th ed.) (book), 1991, pp. 8-36 to 8-42.

(Continued)

Primary Examiner — Craig Schneider
(74) Attorney, Agent, or Firm — ThompsonMcMullan, P.C.; Robert C. Lyne, Jr.

(57) ABSTRACT

A natural circulation water tube package boiler is assembled in a factory in two self-contained steam generating units. The first unit has a combustion chamber, but no convection tubes. The second unit has convection tubes, but no combustion chamber. Each unit has a mud drum, a steam drum, and tubes connecting the drums. Each steam generating unit is transported separately by truck or railcar to the operating site, where the rear end of the first unit is connected to the front end of the second unit by a large connecting duct; the mud drums of the respective units are connected to each other by water piping; the steam drums of the respective units are connected to each other by water piping and steam piping located above and below the waterline respectively; and the steam drum of the second unit is connected to the water drum of the first unit by water piping. The two steam generating units operate in tandem, with combustion gases flowing through the full width of both units serially, and out the rear of the second unit.

9 Claims, 11 Drawing Sheets

OTHER PUBLICATIONS

Zurn Industries, Inc., Keystone Steam Generating Systems (brochure), 1978, pp. 1-7.
The Bigelow Company, Type A Boiler (brochure).
Nebraska Coal Fired Water Tube Boilers, Nebraska Boiler Company, Inc. (brochure).
A Better Boiler . . . by Design, Abco Industries, Inc. (brochure), 2001.
Modul—Pak II—Model WWF, Industrial Boiler Co., Inc. (brochure).

* cited by examiner

PACKAGE BOILER HAVING STEAM GENERATING UNITS IN TANDEM

CROSS-REFERENCES TO RELATED APPLICATIONS

This application discloses and claims subject matter which was disclosed in provisional patent application Ser. No. 61/002,505 filed Nov. 10, 2007 and titled "Package Boiler Having Steam Generating Units in Tandem".

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

INCORPORATION-BY-REFERENCE OF MATERIAL SUBMITTED ON COMPACT DISC

Not applicable.

BACKGROUND OF THE INVENTION

1. Field of the Invention

This invention pertains to package (i.e., "shop-assembled") boilers for generating steam and, more particularly, to such boilers which have one or more lower and upper drums, with tubes connecting the drums for natural circulation (i.e., without circulation pumps) of the water, steam, and mixtures thereof within the tubes and drums. Such boilers may be fired by natural gas, oil, coal, wood, municipal solid waste, or refuse-derived fuel. (The term "boiler", as used herein, is not limited to a vessel which contains fluid. The term embraces an entire steam generating apparatus, and could include for example, in addition to vessels for containing water and/or steam, a furnace, tubes, drums, pipes, ducts, hardware, and accessories.) A lower drum is a "mud" drum, which is sometimes called a "water" drum. An upper drum is a steam-and-water drum or "steam" drum. Package boilers are assembled in a factory and, unless they are to be transported by water, have a weight and exterior dimensions that comply with the maximum limitations for shipment by truck and/or railcar. Field-erected boilers, in contrast with package boilers, are assembled at the operating site from components and materials shipped to the site.

2. Description of Related Art

Boilers are required in many applications, worldwide, for the production of saturated and superheated steam. Saturated steam is primarily used for process steam, heating, and air conditioning, whereas superheated steam is primarily used in steam turbine applications for the generation of electrical power. A typical boiler consists of three heat absorbing sections: a radiant section, a convection section, and possibly a superheater section. The radiant section is the heat transfer surface area exposed to the flame in the combustion chamber (sometimes called the "furnace" or the "firebox"), whereas the convection section is the heat transfer surface area shielded from the flame, but excluding any superheater. The radiant section and the convection section each comprise riser tubes connecting the mud drum to the steam drum. The superheater section is located in either the high temperature section of the boiler convection section or at the rear of the boiler. Saturated steam generated in the radiant and convection sections of the boiler is collected in the steam drum and then, at the saturation pressure and temperature, is transferred to the superheater section of the boiler, where it is raised to a higher temperature while remaining at approximately constant pressure.

The oxidization of a fuel in the combustion chamber of a boiler generates thermal energy that is transferred to the water in the various sections of the boiler and thereby creates the steam that is generated inside the radiant and convection sections. The efficient conversion of the energy in the fuel into steam is of practical importance, as is the cost of the boiler system.

Figure 2:
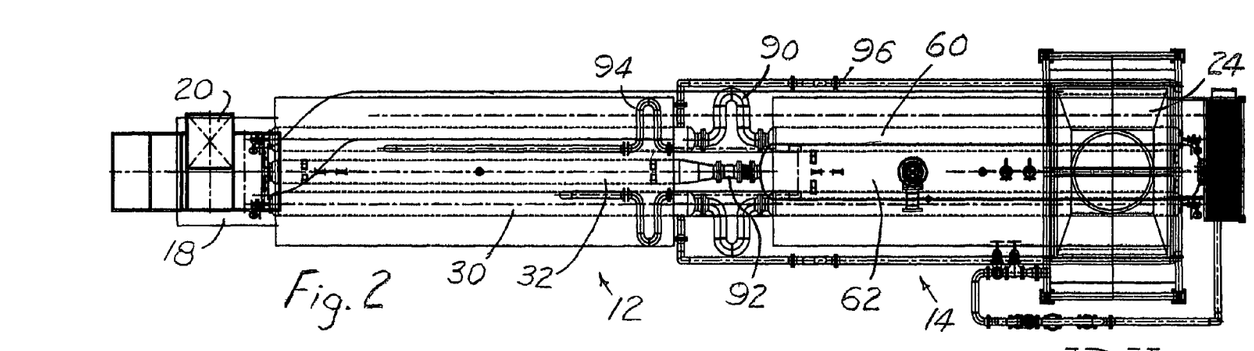
FIG. 2 is a plan view of the boiler shown in FIG. 1.

Package boilers are described in various publications and patents. These include *Steam/Its Generation and Use* ($40^{th}$ edition), published in 1992 by The Babcock and Wilcox Company, at pages 25-8 and 25-9; *Combustion Fossil Power* ($4^{th}$ edition), published in 1991 by Combustion Engineering, Inc. (especially pages 8-36 to 8-42); *Keystone Steam Generating Systems*, a brochure published in 1978 by Zurn Industries, Inc. (especially pages 1 to 7); *Type A Boiler*, a brochure published by The Bigelow Company of Madison, Conn.; Dang U.S. Pat. No. 5,881,551 (especially column 1, lines 35 to 65); and English U.S. Pat. No. 6,901,887. The English patent, for example, discloses a package water tube boiler which has a steam drum and a mud drum disposed within a single enclosure that is transportable by a single truck or railcar. A gas- or oil-fired burner fits within an opening in the front end wall. As best shown in FIG. 2, the combustion gases flow in a U-shaped pattern. The boiler has a furnace or combustion section separated from a convection section by a membrane or curtain wall which serves as a baffle. The gases flow toward the rear end wall (i.e., upward on the page), take a left turn through a furnace exit passage, take another left turn, head back through the convection section toward the front end wall (i.e., downward on the page), and then take a right turn and exit through an outlet. In the furnace the gases heat water and water-steam mixtures in radiant tubes by radiation, while in the convection section the gases heat water in convection tubes by convection. Other patents relating to package or small boilers are Shimer U.S. Pat. No. 2,187,632; Rehm U.S. Pat. No. 2,322,390; Marshall U.S. Pat. No. 2,763,243; Marshall U.S. Pat. No. 2,823,651; Vorkauf U.S. Pat. No. 2,988,063; Winship U.S. Pat. No. 3,266,467; Russo U.S. Pat. No. 3,543,733; Gerst U.S. Pat. No. 3,465,726; and Sharan U.S. Pat. No. 3,608,525.

A fundamental advantage of package boilers is an installed cost which is considerably lower than that of a field-erected boiler. This cost advantage is made possible by a number of factors. These include basic designs that allow standardized processes for fabricating multiple units in a factory, while providing sufficient flexibility to permit straightforward, efficient, and technically sound adaptation to the specific needs of a particular application. Another advantage is quality and reliability made possible by manufacture under controlled conditions by skilled and experienced personnel.

The following table summarizes current working limitations for shipment of package boilers in the U.S. by truck and railcar:

|       | Length | Width  | Height | Weight      |
|-------|--------|--------|--------|-------------|
| Truck | 480 in | 192 in | 180 in | 130,000 lbs |
| Railcar | 540 in | 150 in | 198 in | 300,000 lbs |

In recent years the number of advantages of package water tube boilers over field-erected boilers, and the growing magnitudes of some of these advantages, are responsible for their increased popularity and use of such boilers in the United States, and has resulted in their being called upon for more demanding applications. In response, innovation has been concentrated in the structure and design geometry of each new package water tube boiler design. English U.S. Pat. No. 6,901,887, for example, discloses a novel offset drum arrangement and water tube location, path, and configuration, in order to increase the heat transfer surfaces of the steam drum and the radiant tubes to increase boiler performance and efficiency, while shielding the drum from substantially all the flame in the combustion chamber. This serves to maximize the heat transfer area for a given total boiler volume (as determined by its exterior dimensions), and ultimately the steam generation capacity (as measured for example in pounds per hour) for that volume. This patented design also allows optimization of the width and height of the combustion chamber by making them approximately equal, so that the transverse cross-section of the combustion chamber is approximately square, thereby enabling the combustion chamber to better conform to the shape of the flame, facilitating control, and reducing NOx emissions.

Such structural and geometric innovations in design may not continue to solve the problem of meeting the increased demands, however. The operating parameters of package water tube boilers subject to the demands are approaching asymptotically the unyielding design limits imposed by the requirements of truck and rail transportation. The closer the designs approach these limits, the more they lose their flexibility, and specifically their ability to accommodate other, application-specific design requirements.

Consequently, field-erected boilers have been chosen instead of package boilers for many of these applications. While some demanding applications may permit the use of a number of conventional package boilers in combination, this requires unnecessary duplication and is likely to prevent the designer of the package boiler from taking full advantage of economies of scale, which in turn imposes penalties of cost and efficiency on the package boiler, relative to the field-erected boiler in competition with it.

An example of a demanding application that does not permit the use of conventional package boilers in combination is a boiler that must have a combustion chamber with a large internal volume and a burner with a large transverse cross section in order to keep emissions at desired levels. Such applications typically mix fuel, air, and exhaust gases over a large volume in order to reduce the formation of NOx gases. They have been required for boilers used in processes that produce ethanol.

An example of a demanding application that does permit the use of conventional package boilers in combination is one that merely has a requirement for steam capacity, either continuous or peak demand, that exceeds the steam capacity of a single, conventional package boiler. In such applications the package boilers are typically connected in parallel or assigned to a portion of the load.

The general concept of a package boiler assembled from two modules, each of which is transportable by rail or road, is known. In 1976 Csathy U.S. Pat. No. 3,971,345 disclosed a coal-fired package boiler assembled from two such modules—a furnace module and a convection module. The furnace module was stood on its end and bolted to the convection module at the operating site, in order to provide a large, tall, vertical furnace, which was necessary to address problems such as incomplete combustion of the carbon particles in the furnace module and excessive slagging in the convection module. Similar arrangements have been disclosed in commercial literature as "package", "shop-assembled", or "modular". Examples are the brochure *Nebraska Coal Fired Water Tube Boilers* published by Nebraska Boiler Company, Inc.; the brochure *A Better Boiler . . . By Design*, published by Abco Industries, Inc., and the information sheet *Modul-Pak II-Model WWF*, published by Industrial Boiler Co., Inc. These appear to require more elaborate on-site assembly/construction than Csathy. Conceptually, while Csathy and these commercial designs separated boiler components into modules that can be transported separately, I do not believe that they were seeking to design an efficient, flexible system of modules from the ground up. None of them, for example, discloses a furnace module having a mud drum, a steam drum, any serious steam-generating capacity, or any steam separation apparatus.

BRIEF SUMMARY OF THE INVENTION

An object of the invention is to enable package boilers to be used in demanding applications hitherto available only to field-erected boilers.

Another object of the invention is to provide package boilers that have combustion chambers with a large internal volume and burners with a large transverse cross-sectional area, which boilers are fuel efficient and have lower emissions than prior art package boilers.

Another object of the invention is to provide package boilers that have high steam capacities, in total output (as measured for example in pounds per hour) and in weight efficiency (as measured for example in pounds per hour per pound of shipped weight).

Another object of the invention is to provide package boilers that have a low frictional resistance to the flow of combustion gases through them, and hence a low pressure drop in the flow.

Another object of the invention is to provide package boilers that comprise two steam generating units, one of which is designed to be within the limitations on shipment within the U.S. by truck but not necessarily by railcar, and the other of which is designed to be within the limitations on shipment in the U.S. by railcar but not necessarily by truck.

Another object of the invention is to achieve the objects stated above, or as many of them as possible and to the greatest extent possible, at the highest possible performance in thermal efficiency, steam quality, and reduction in emissions, and at the lowest possible cost in materials, labor, shipping, fuel, and operation.

According to the invention, a package boiler has two or more self-contained, similar, steam generating units that operate in tandem. Each steam generating unit ("SGU") is a module comprising a large, horizontal, tubular enclosure having the general proportions of a boxcar and containing a mud drum and a steam drum. In each module, riser tubes connect the mud drum to the steam drum. The SGUs are connected end-to-end by a large connecting duct for serial flow of hot combustion gases lengthwise through them. The gases pass over the outside surfaces of the drums and the riser tubes and thereby heat the water, saturated steam, and mixtures they contain. Each steam drum contains equipment for separating steam from water.

In the first SGU ("SGU-1") a combustion chamber, which is preferably oil- or natural gas-fired, is disposed generally between the mud drum and steam drum, and the riser tubes are radiant tubes connected to each other to form membrane walls surrounding and defining the combustion chamber. SGU-1 has no convection tubes. Preferably the combustion chamber is filled with a horizontal flame created by an oil- or natural gas-fired burner in a large entrance opening in the front wall of SGU-1. In the second SGU ("SGU-2") there is no combustion chamber or furnace and the riser tubes are convection tubes. These tubes, along with downcomer tubes connecting the steam drum and the mud drums at the rear of SGU-2, are in a forest-like array. The membrane walls of both SGUs extend along their side walls, are joined to them, and support them. These membrane walls, portions of the drums, and the interior surfaces of the SGU-connecting duct define the transverse periphery of the flow path of the combustion gases.

Four inter-SGU pipes (or sets of pipes) connect the mud and steam drums of SGU-1 and SGU-2 for operation of the SGUs in tandem. The first connects the mud drums of SGU-1 to the mud drums of SGU-2. The second connects the upper portion of the steam drum of SGU-1 to the upper portion of the steam drum of SGU-2. The third connects the lower portion of the steam drum of SGU-1 to the lower portion of steam drum of SGU-2. The fourth connects the lower portion at the rear of the steam drum of SGU-2 to the lower portions of the mud drums of SGU-1. (With respect to steam drums, "upper portion" and "lower portion" mean the portions above and below the waterline.) The purpose of this inter-SGU piping is to establish, and to maintain during a wide range of operating conditions, proper natural circulation within and between the SGUs in order to avoid hot spots and cold spots within the system, as well as to increase efficiency. This piping is important because proper natural circulation depends upon differences in the density of water and water-and-steam mixtures at various locations in the system to make them flow along a desired path within the tubes and drums.

SGU-1 is particularly well suited to be shipped by truck, because shipment by truck allows a greater width, which as discussed above may be necessary because of wide burners for a high output package boiler. On the other hand, SGU-2, being inherently heavier because of its large number of tubes, is particularly well suited to be shipped by railcar, because shipment by rail allows a greater weight. Thus it could be said that the invention permits package boiler designers to be friendly to both highways and passing trains.

DETAILED DESCRIPTION OF THE INVENTION

Definitions

The following terms are used throughout this application in accordance with these definitions, unless a different interpretation is required by the context.

The terms "steam generating unit", and "SGU" mean a discrete, self-contained, steam generating apparatus which may be transported, handled, and located on an operating site as a unitary structure.

The term SGU-1 means an SGU that has a combustion chamber, but no convection tubes.

The term SGU-2 means an SGU that has convection tubes, but no combustion chamber.

The term "steam drum" means a large cylindrical drum in a boiler which separates steam from a steam-water mixture and directs the steam and water along different paths.

The term "tandem" refers to two or more similar components arranged one behind the other with respect to the flow of combustion gas through them.

The term "transverse cross section" means a cross section in a plane perpendicular to a longitudinal axis or a central axis.

Figure 1:
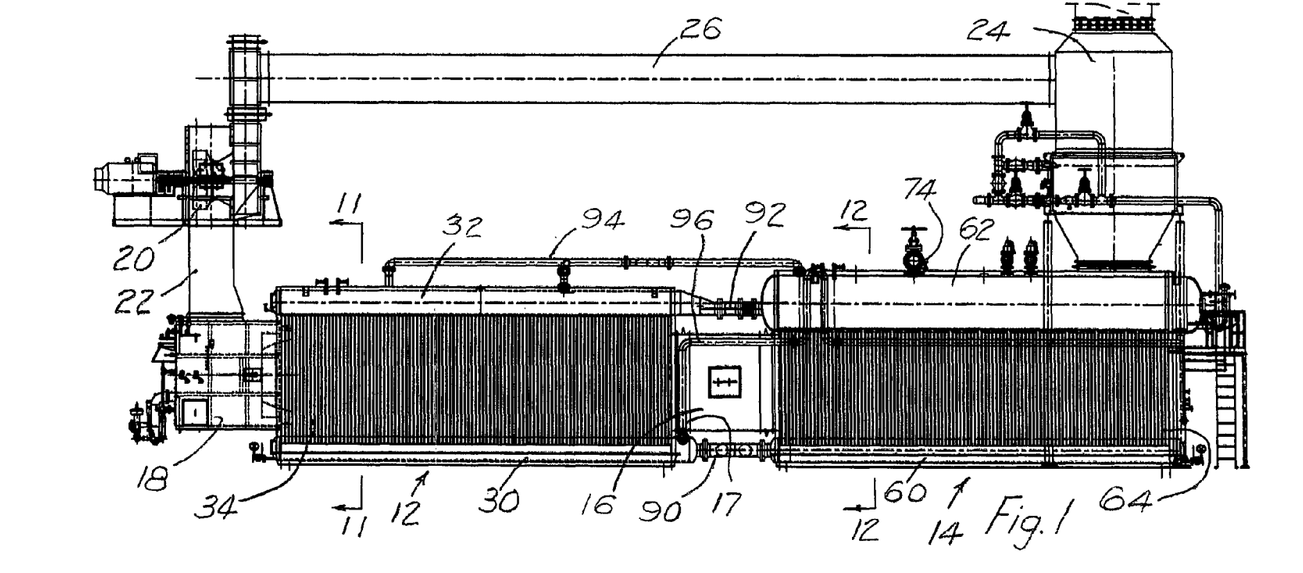
FIG. 1 is a side elevational view of a package water tube boiler according to the invention, with the side wall facing the viewer removed to show the mud and steam drums and the riser tubes.
Figure 3:
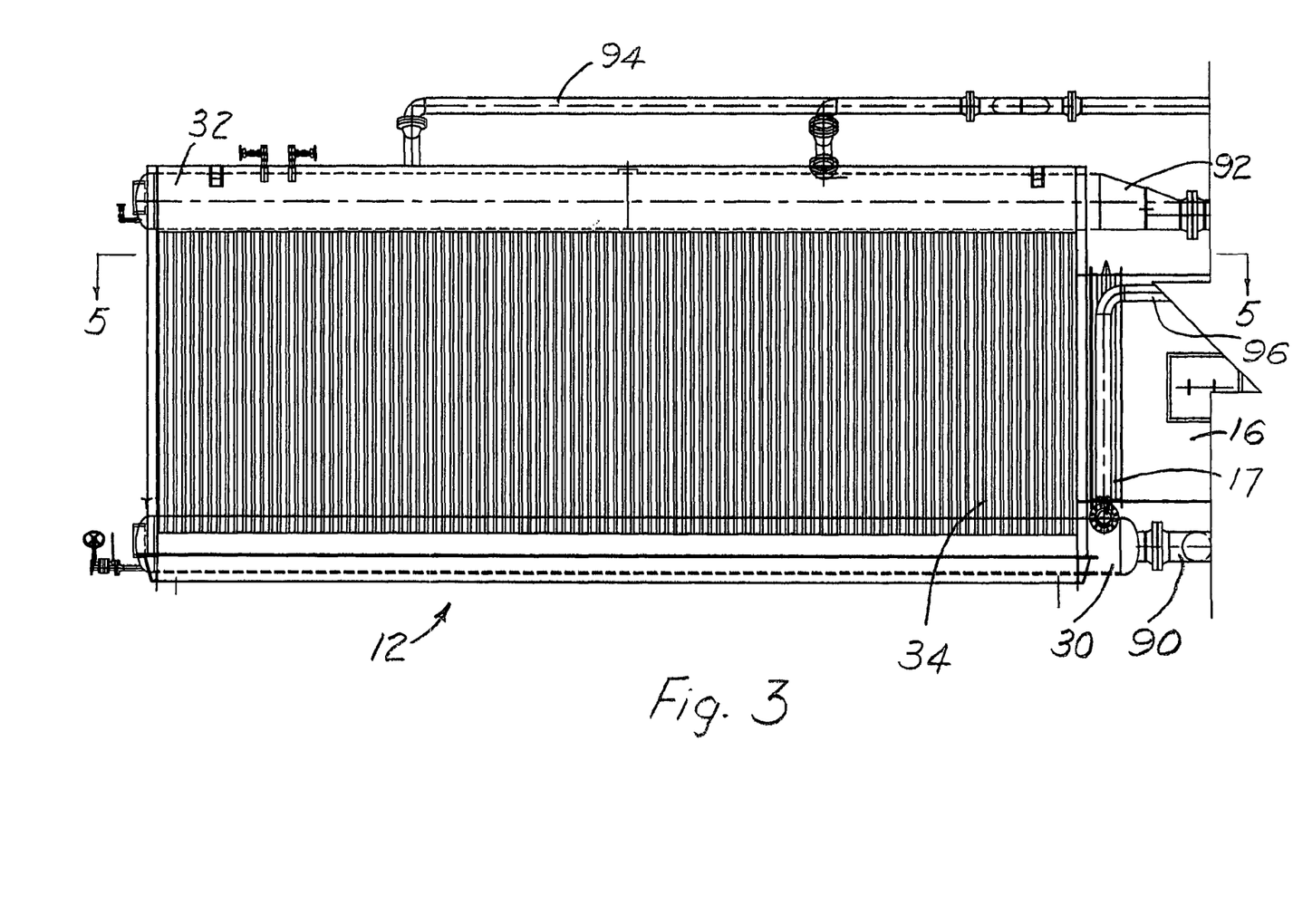
FIG. 3 is an enlarged view of the left hand side of FIG. 1, showing SGU-1 with the burner removed.
Figure 4:
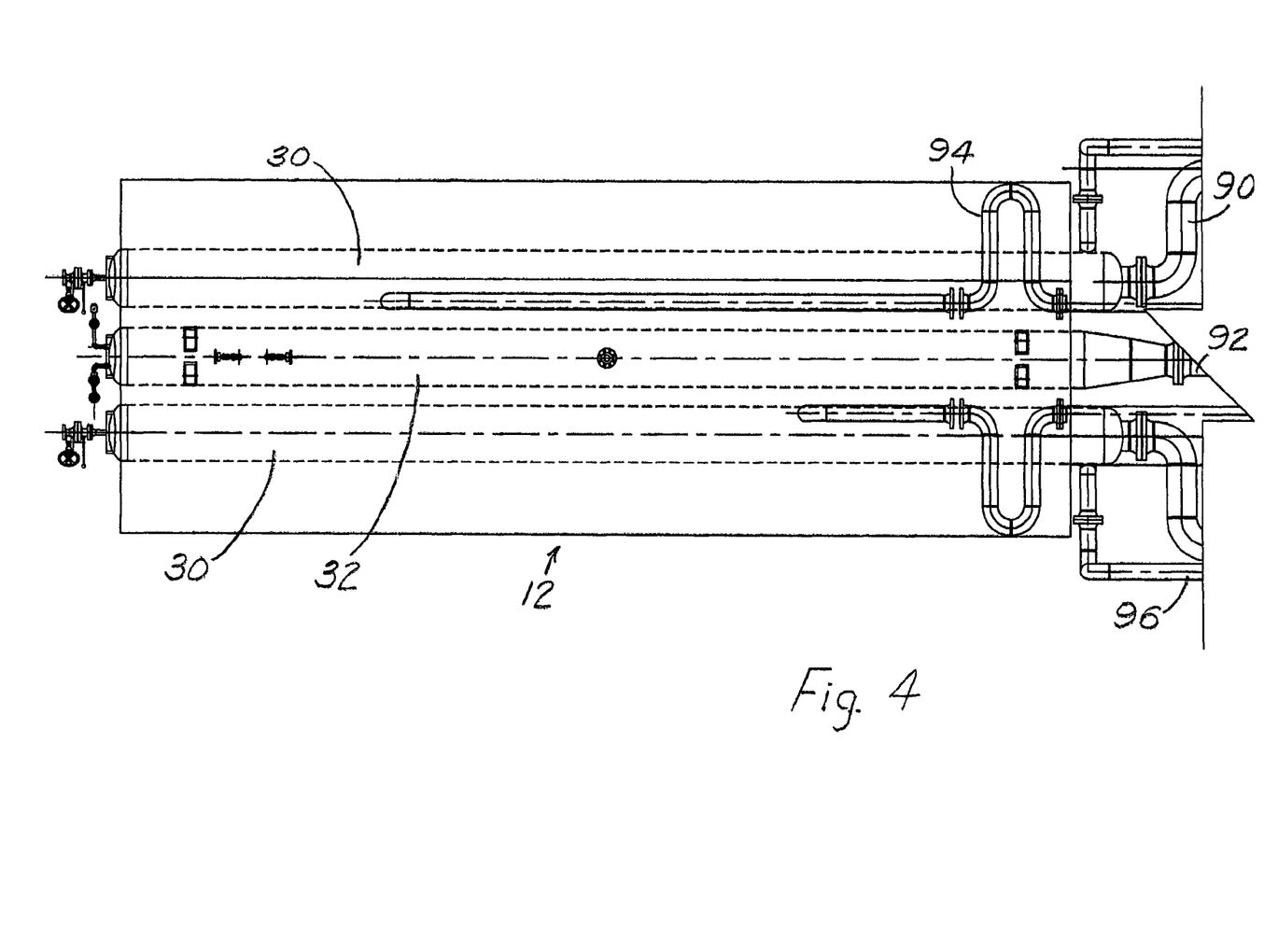
FIG. 4 is an enlarged view of the left hand side of FIG. 2, showing SGU-1 with the burner removed.
Figure 6:
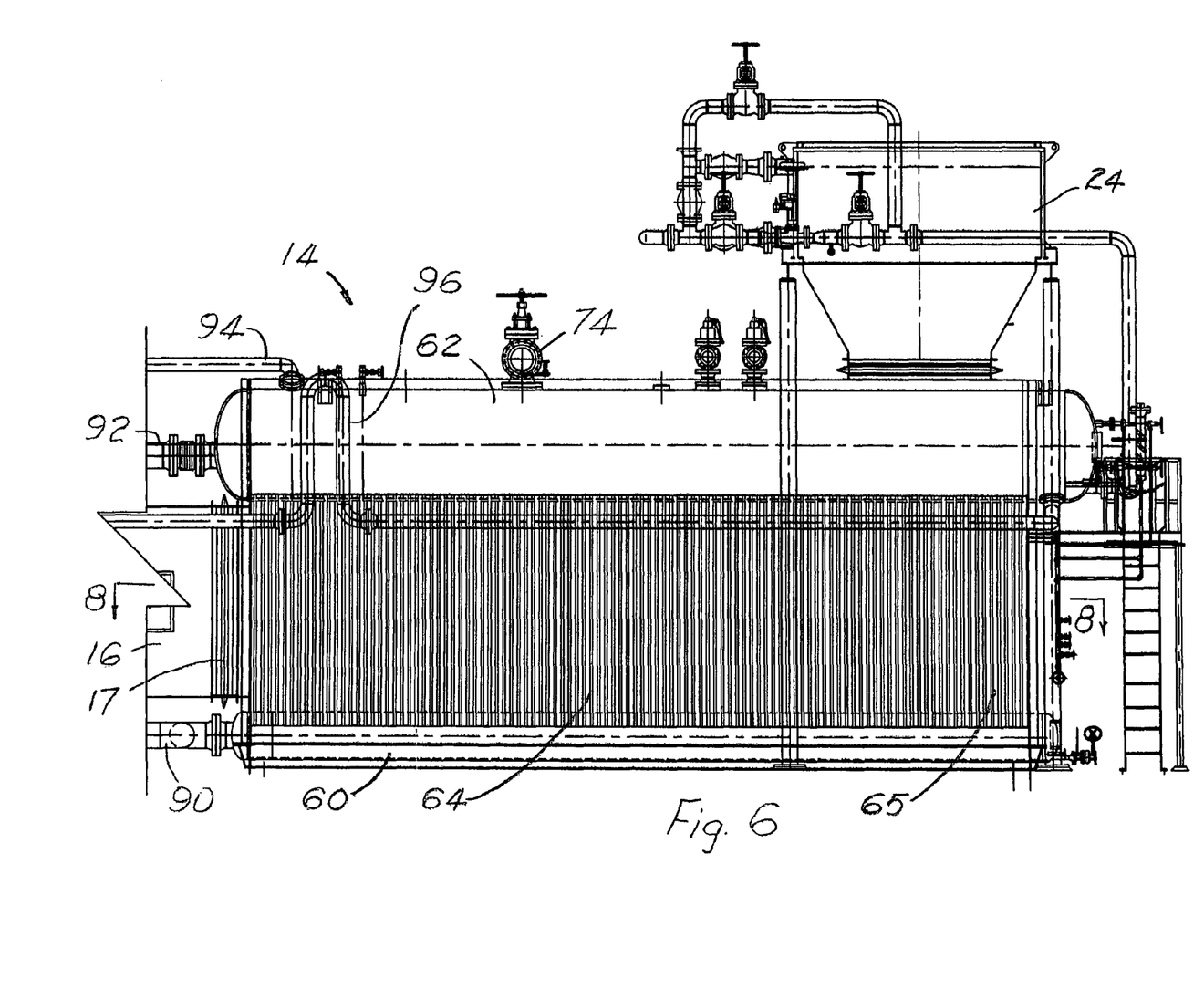
FIG. 6 is an enlarged view of the right hand side of FIG. 1, showing SGU-2.
Figure 7:
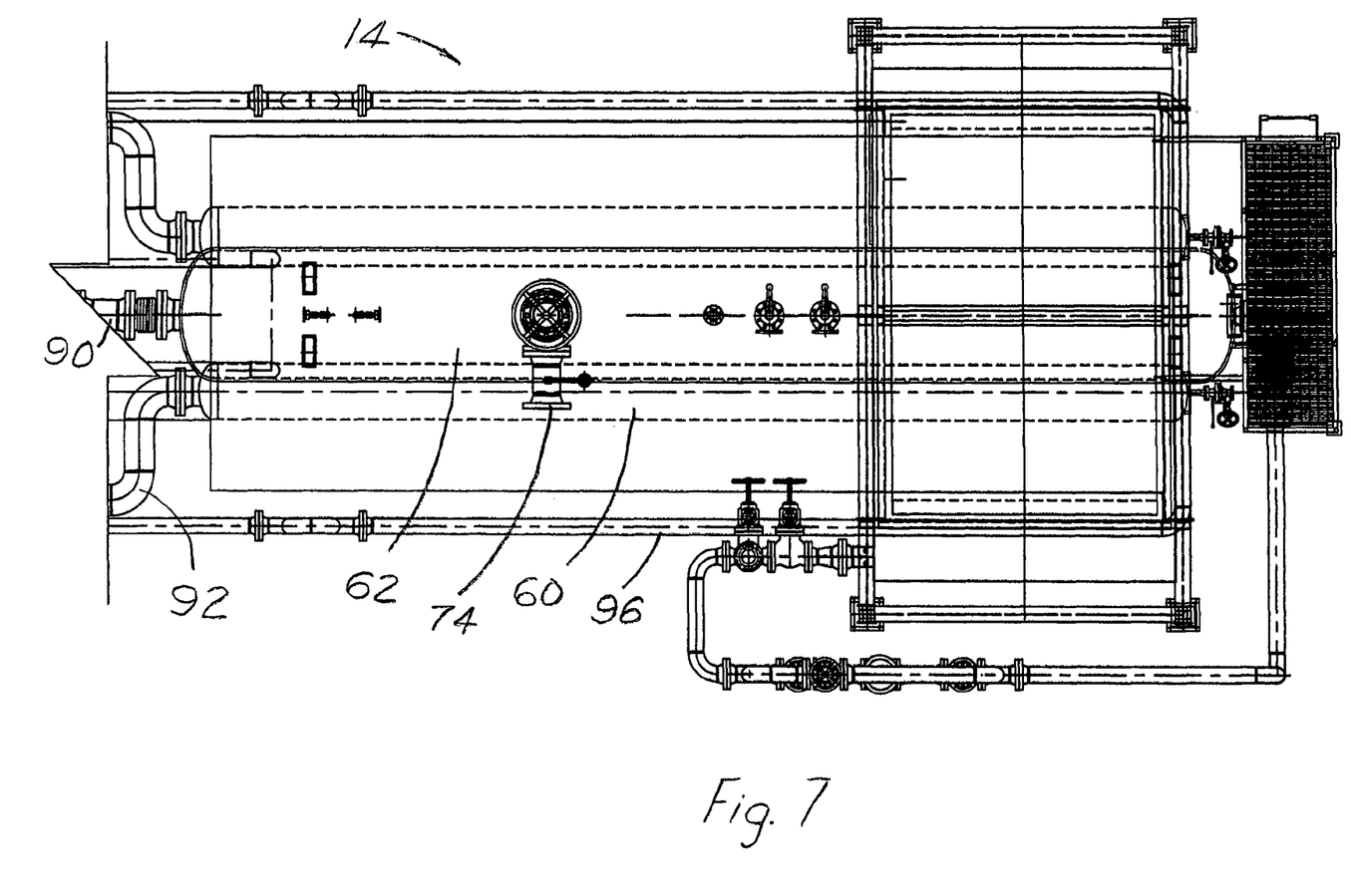
FIG. 7 is an enlarged view of the right hand side of FIG. 2, showing SGU-2.

As shown in FIGS. 1 and 2, a package boiler according to the invention consists primarily of first steam generating unit 12, second steam generating unit 14, and large connecting duct 16 connecting them in tandem at expansion joints 17 (also shown in FIGS. 3 and 6). Oil- or gas-fired burner 18 with inlets for fuel and air is connected to the front of first unit 12. Above the burner is combustion air fan 20, which is connected to the burner by combustion air duct 22. Fan 20 is connected to economizer 24 by flue gas recirculating duct 26. The economizer is connected to a large combustion gas exit opening in the top wall at the rear of second unit 14.

Figure 5:
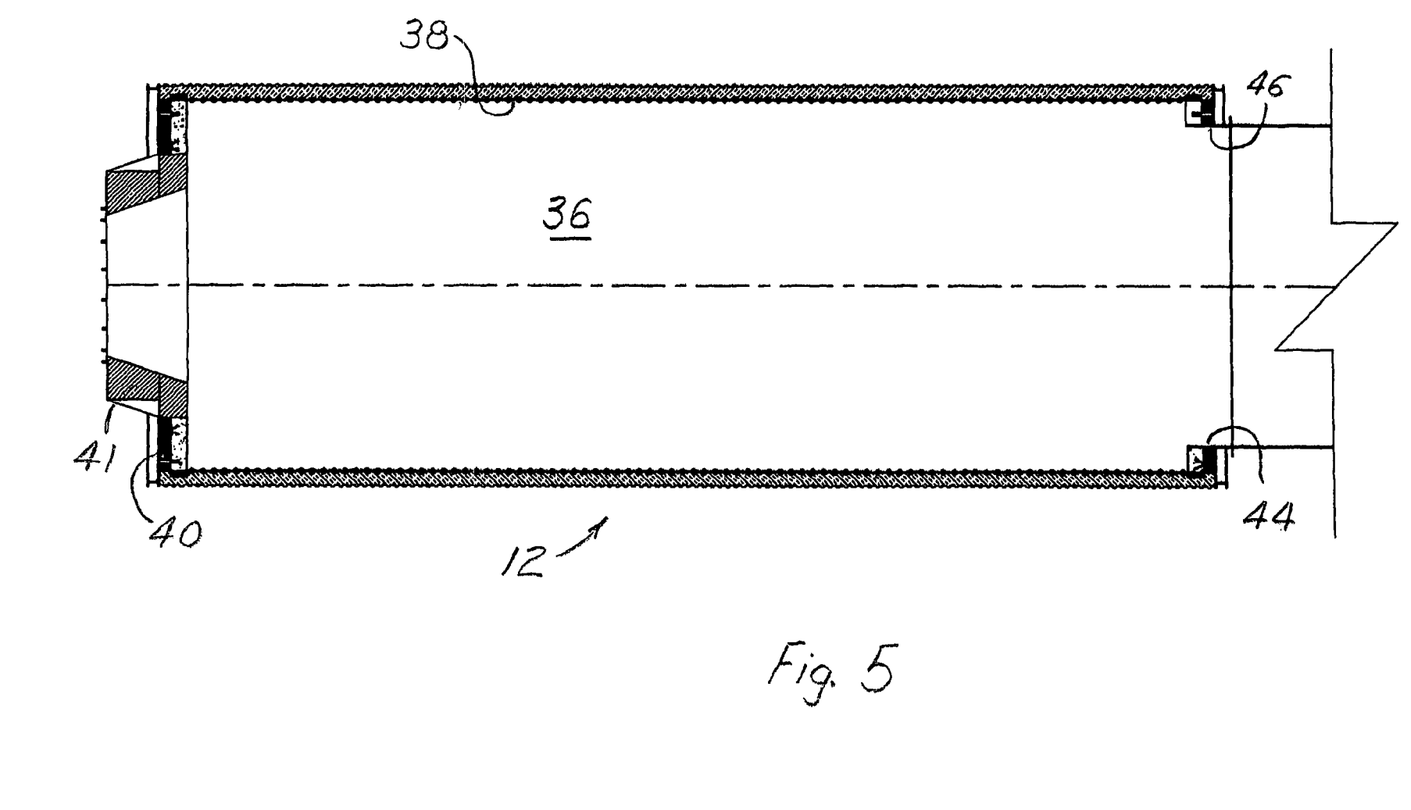
FIG. 5 is a simplified sectional elevation view taken at 5-5 in FIG. 3, showing SGU-1 with the burner removed and showing the SGU-connecting duct and expansion joint schematically.
Figure 8:
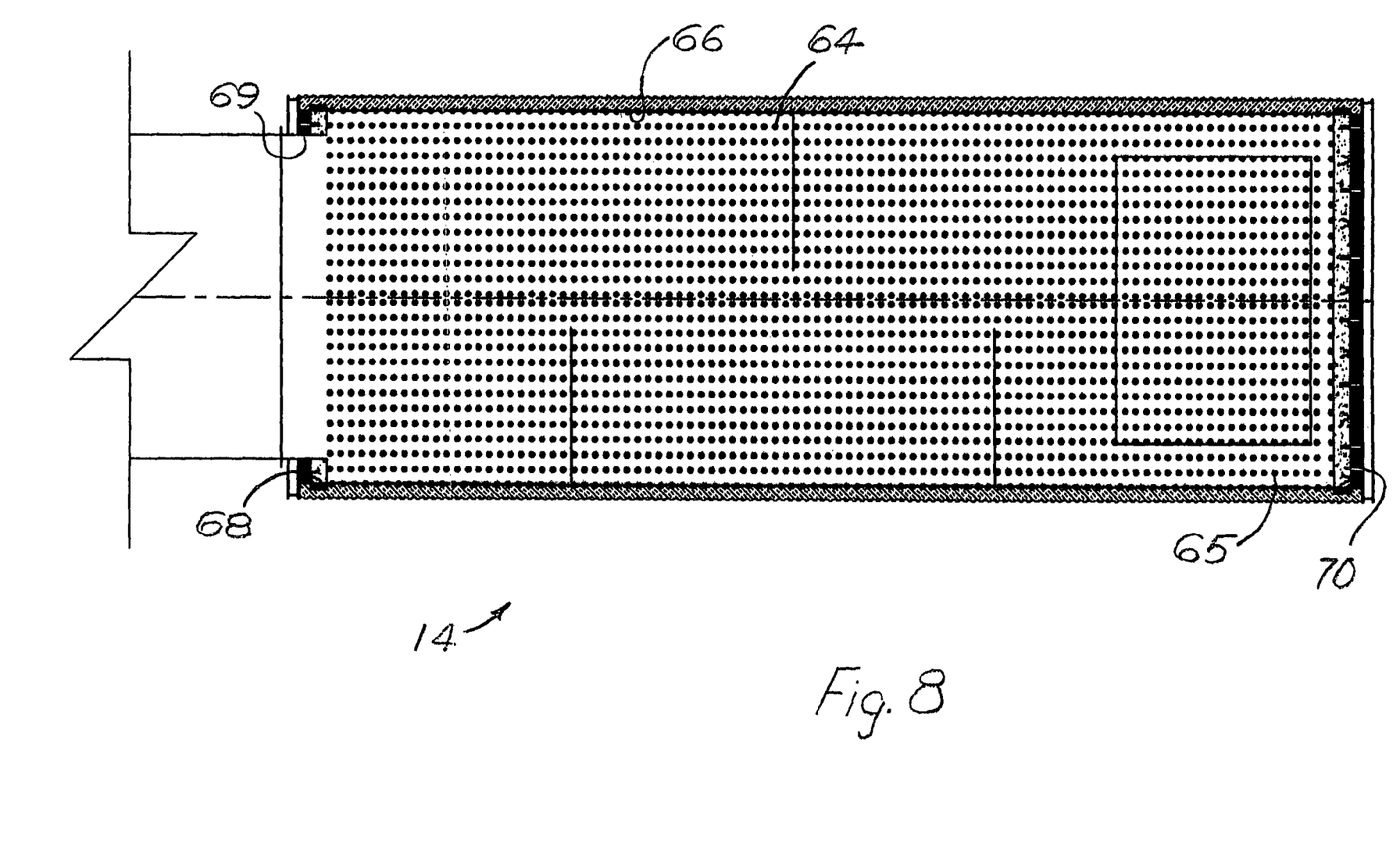
FIG. 8 is a simplified sectional elevation view taken at 8-8 in FIG. 6, showing SGU-2 and showing the SGU-connecting duct and expansion joint schematically.
Figure 9:
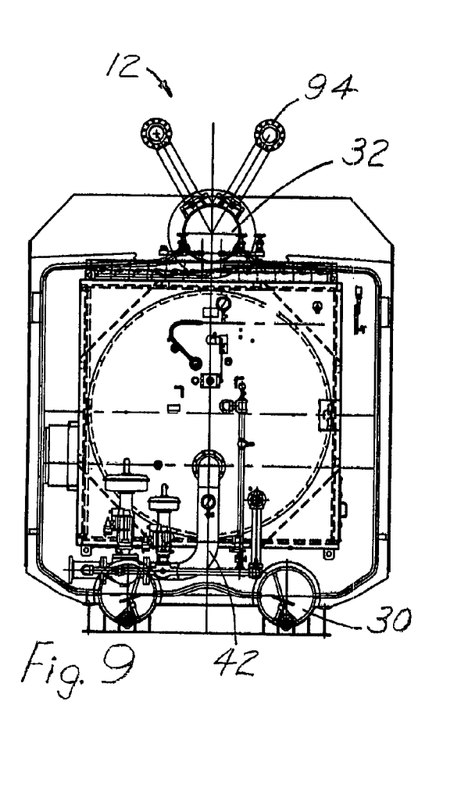
FIG. 9 is a front elevation view of the boiler shown in FIG. 1, showing SGU-1 with the burner removed.
Figure 10:
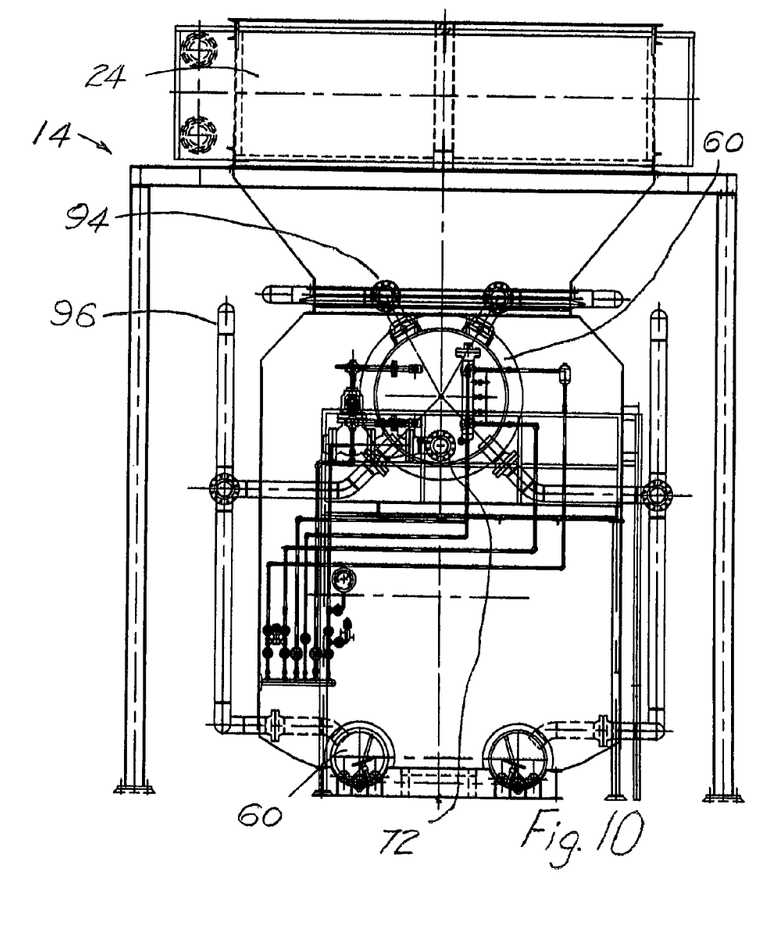
FIG. 10 is a rear elevation view of the boiler shown in FIG. 1 showing SGU-2.
Figure 11:
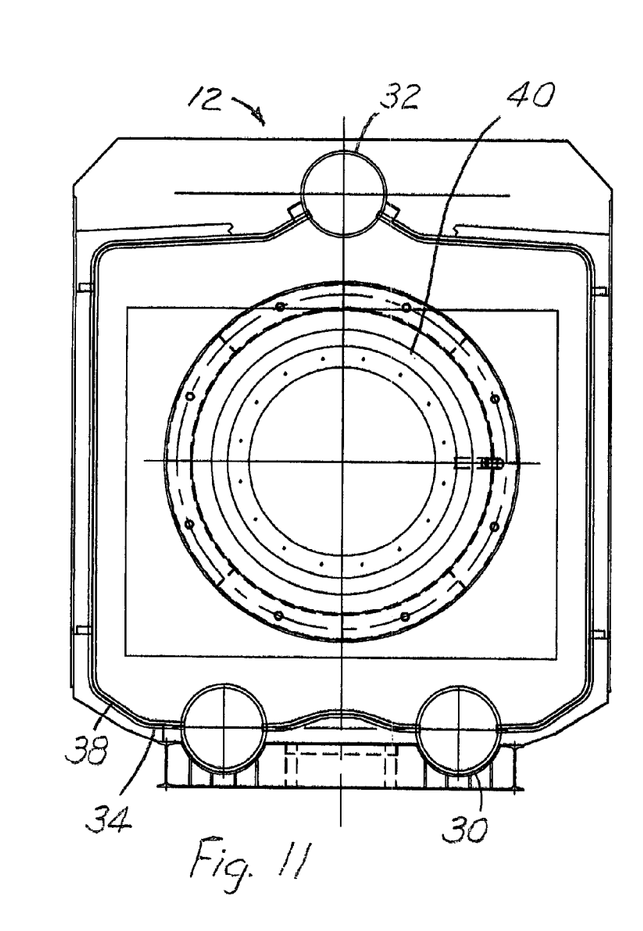
FIG. 11 is a sectional front view taken at 11-11 in FIG. 1, showing SGU-1.
Figure 12:
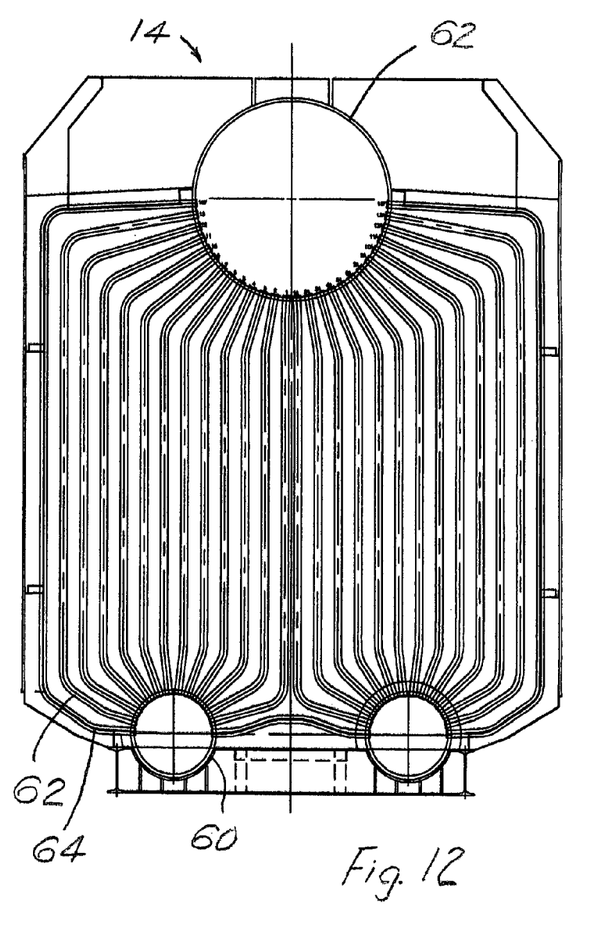
FIG. 12 is a sectional rear view taken at 12-12 in FIG. 1, showing SGU-2.

As shown in FIGS. 1-5 and 9-11, first unit 12 (i.e., SGU-1) has two mud drums 30 and one steam drum 32 arranged in an A-type configuration. The steam drum contains mechanical steam separating equipment, such as baffles and screens. The mud drums are connected to each other by water transfer piping (not shown) and are connected to the steam drum by radiant riser tubes 34. Combustion chamber 36 is defined by the riser tubes which surround it and are connected to each other by fins to form membrane wall 38. Burner 18 is installed in an opening in front wall 40 of SGU-1. The opening and the transverse cross section of the burner are large. The burner has fuel inlet pipe 42 (FIG. 9) and an inlet (not shown) for recirculating combustion gas, in order to reduce NOx emissions. The combustion chamber is also large, having an internal volume of at least 2,940 cu. ft. As best shown in FIGS. 5 and 8, the front wall of first unit 12 has collar 41 for the burner, and rear wall 44 of first unit 12 has large, square passage 46 whose transverse cross section corresponds to that of the interior of SGU-connection duct 16. First unit 12 does not have any convection tubes or downcomer tubes.

Similarly, as shown in FIGS. 1, 2, 6-8, 10, and 12, second unit 14 (i.e., SGI-2) has two mud drums 60 and one steam drum 62 arranged in an A-type configuration. The steam drum contains mechanical steam separating equipment, such as baffles and screens. The mud drums are connected to each other by water transfer piping (not shown) and are connected to the steam drum by convection riser tubes 64 that, together with downcomer tubes 65 connecting the steam drum and the mud drums, fill the interior of SGU-2 in a forest-like array. The downcomer tubes, which physically are substantially the same as the convection riser tubes, are at the rear of SGU-2 at the right hand side of FIGS. 6 and 8. The outermost tubes are connected to each other by fins to form membrane wall 66. Front wall 68 of SGU-2 has a large, square opening 69 whose transverse cross section corresponds to that of the interior of SGU-connecting duct 16. Feedwater inlet 72 (FIG. 10) is at the rear lower portion of the SGU-2 steam drum. Saturated steam delivery point 74 is at the top of the steam drum. SGU-2 does not have a combustion chamber. Conceptually SGU-2 is similar to a conventional package boiler fired by waste heat.

As shown in FIGS. 1, 2, 6, 7, 9, and 10, water transfer piping 90 connects the mud drums of SGU-1 to the mud drums of SGU-2. Water transfer piping 92 connects the lower portion of the steam drum of SGU-1 to the lower portion of the steam drum of SGU-2. Steam transfer piping 94 connects the upper portion of the steam drum of SGU-1 to the upper portion of the steam drum of SGU-2. Downcomer piping 96 connects the lower portion of the rear of the steam drum of SGU-2 to the mud drums of SGU-1.

In the operation of the tandem boiler according to the invention, the gas flow is from left to right as it is depicted in the plan and elevation views. Combustion gases flow serially from burner 18, through SGU-1, through SGU-connecting duct 16, through SGU-2, and exit through the rear of SGU-2, either through the top wall, as shown, or through an opening (not shown) in rear wall 70. The flow path is the full width of each module, between the opposed membrane walls. It does not make a U-turn within either module.

The natural circulation of water, steam, and mixtures thereof within the tubes and drums of package water tube boilers is generally as described in the prior art, for example English U.S. Pat. No. 6,901,887, "Package Water Tube Boiler Having Two Offset Drums", which also contains other information concerning the operation and construction of package water tube boilers. As mentioned above, the circulation is the result of differences in the densities of the water and the mixtures. To insure such natural circulation, water flows from SGU-2 to SGU-1 in water transfer piping 90 and 96, since the coldest water in the steam drums is in the area of feedwater inlet 72, the entrance to piping 96, and the entrances to the downcomer tubes. The purpose of this inter-SGU piping is to establish, and to maintain during a wide range of operating conditions, proper natural circulation between and within the SGUs in order to avoid hot spots and cold spots within the system, as well as to increase efficiency. The provision of this piping is important because proper gravity-driven natural circulation depends upon differences in the density of water and water-and-steam mixtures at various locations in the system to make them flow along desired paths within the tubes and drums.

It should be noted that the diameter of steam drum 62 is substantially greater than that of steam drum 32. This allows the internal height of the combustion chamber in SGU-1 to be greater, because a drum having the relatively large diameter of steam drum 62 is not required to be present in the unit.

It should also be noted that the steam drum of SGU-1 is a steam drum, not a steam header. Steam drums are discussed in *Steam/Its Generation and Use*, which is cited above, at pages 5-12 to 5-14, and Combustion Fossil Power, which is also cited above, at pages 5-25 to 5-35. Headers are discussed in *Steam/Its Generation and Use* at page 38-6.

Boilers according to the present invention are preferably oil- or gas-fired, with a burner in the front wall of SGU-1 as shown and described. It will be understood, however, that the SGU-1 may be modified for use with solid fuel. In that case, the burner would be eliminated, SGU-1 would be elevated, and suitable solid fuel handling and combusting equipment and ash receiving equipment provided beneath it, in communication with the combustion chamber.

Figure 13:
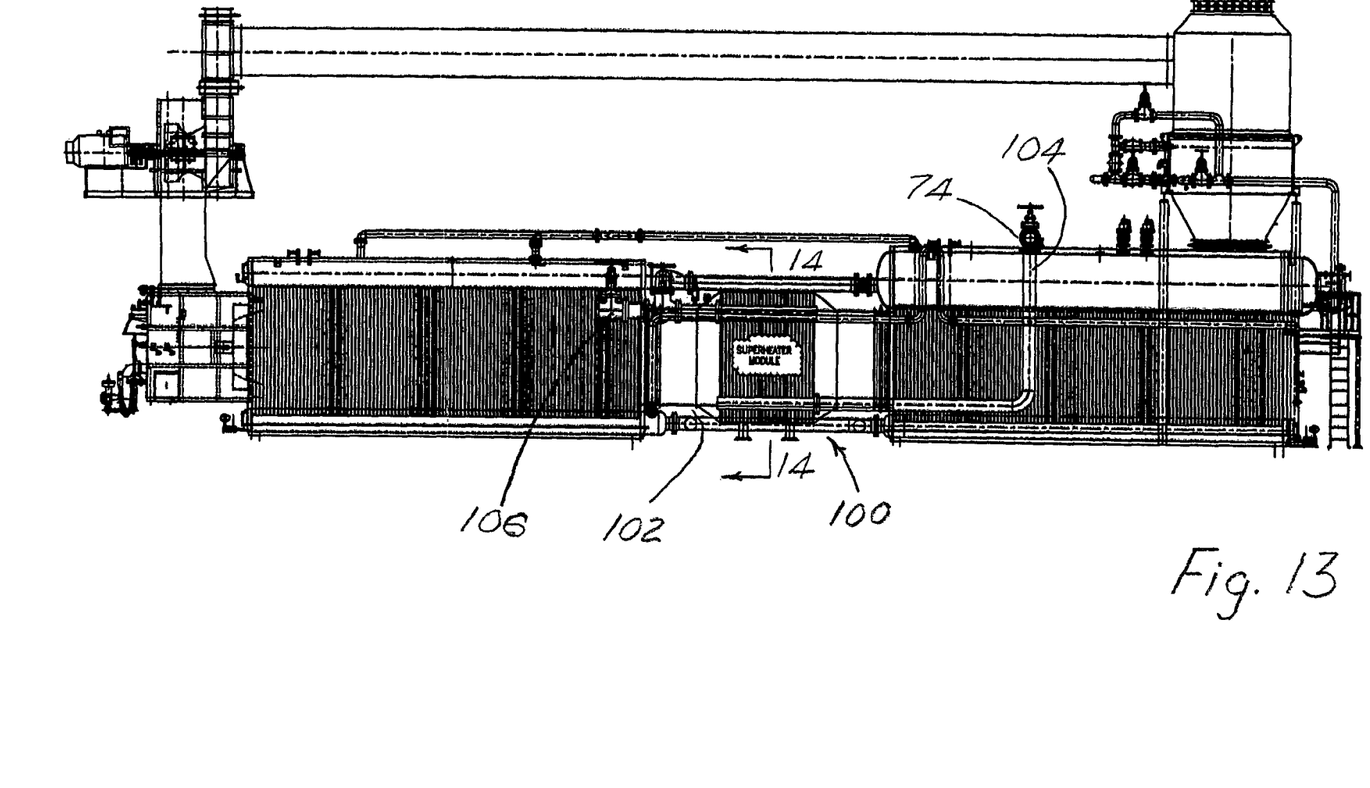
FIG. 13 is a side elevational view of another embodiment of a package water tube boiler according to the invention, which includes a superheater, with the side wall facing the viewer removed to show the mud and steam drums and the riser tubes.
Figure 14:
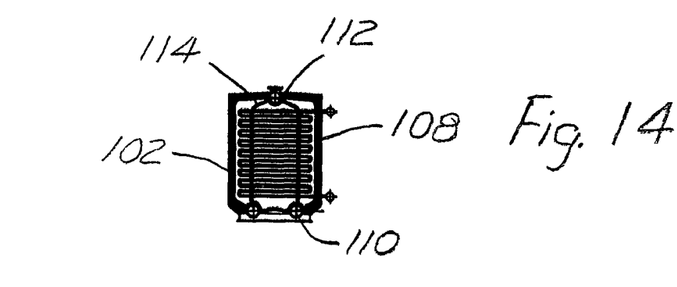
FIG. 14 is a sectional rear view taken at 14-14 in FIG. 13, showing the superheater.

As shown in FIGS. 13 and 14, superheater 100 may be conveniently and efficiently provided in SGU-connecting duct 102. The superheater receives saturated steam from piping 104 connected to the top of steam drum 62 and discharges superheated steam at delivery point 106. The superheater has superheater tubes 108, lower headers 110 connected to the mud drums of the SGUs, upper headers 112 connected to the steam drums of the SGUs, and riser tubes 114 connecting the lower headers to the upper headers.

Figure 15:
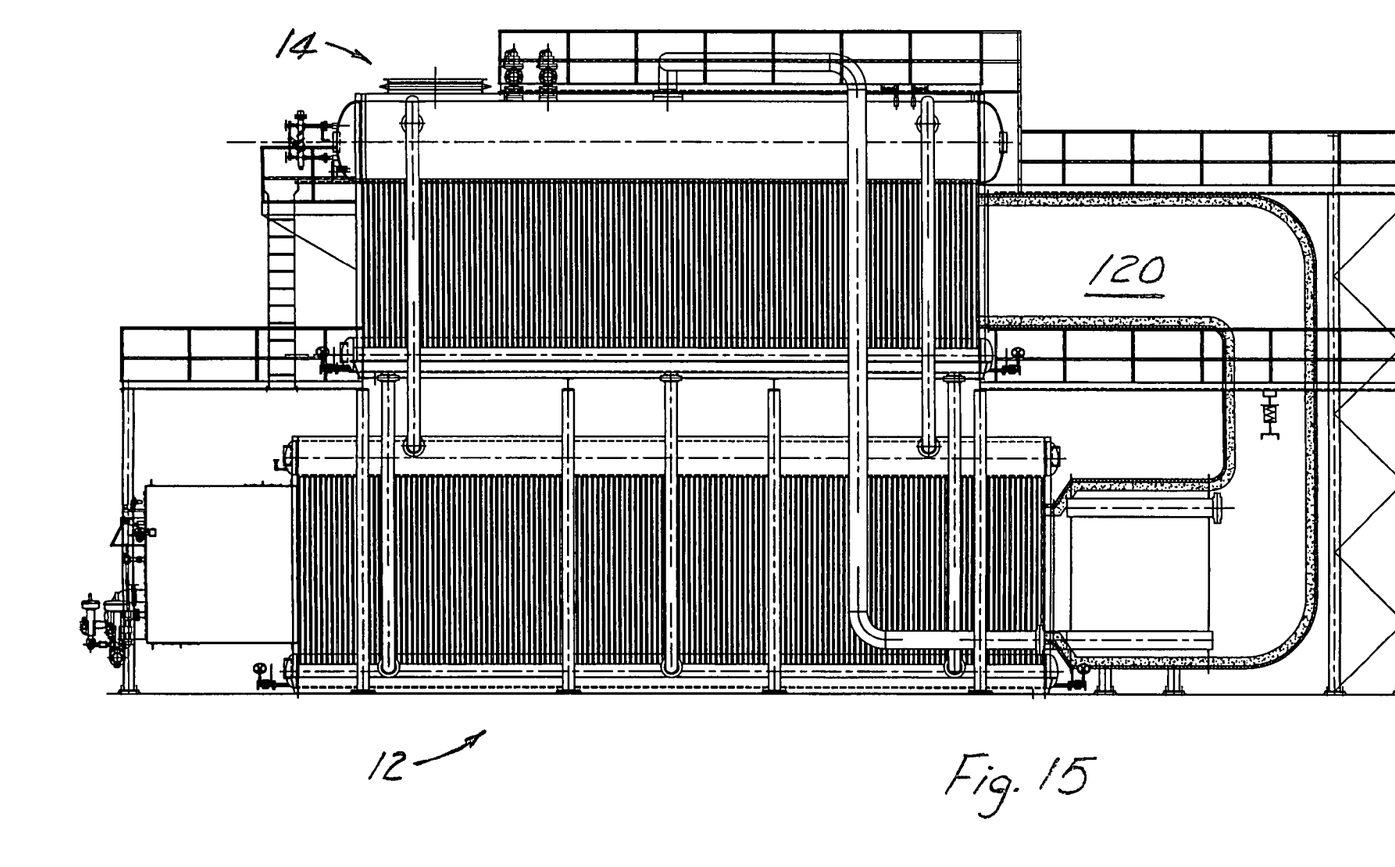
FIG. 15 is a side elevational view of another embodiment of a package water tube boiler according to the invention, in which the SGUs are in an over-and-under configuration, with the side wall facing the viewer removed to show the mud and steam drums and the riser tubes.

SGU-1 and SGU-2 do not need to be physically aligned on the same longitudinal axis, although having them aligned minimizes frictional resistance to combustion gas flow. To conform to the space requirements for a particular site, the SGU-connecting duct may be curved, to permit SGU-1 and SGU-2 to be parallel, or at an angle to each other, or one above the other. FIG. 15 shows an over-and-under configuration in which SGU-2 is directly above SGU-1 and SGU-connecting duct 120 is U-shaped. The combustion gases in SGU-1 flow from left to right and the combustion gases in SGU-2 flow from right to left. FIG. 15 does not show all the inter-SGU piping.

A number of other variations are also possible:

(1) The mud drum(s) and steam drum(s) in the SGUs may be in a configuration other than an A-type configuration, for example, D-type, O-type, or offset drum.

(2) SGU-1 may be modified for use with solid fuel, in which case the burner would be eliminated, SGU-1 would be elevated, and suitable solid fuel handling and combusting equipment and ash receiving equipment provided beneath it, in communication with the combustion chamber.

(2) The combustion gas outlet from SGU-2 can be either in the top wall, as shown in the drawings, or in (or substituted for) the rear wall.

(3) The steam drums of SGU-1 and SGU-2 can be at different pressures.

(4) There can be more that two SGUs. The number of SGU-1s and SGU-2s do not have to be equal; there can be one SGU-1 and two SGU-2s, or vice versa.

(5) There can be more than one burner in the front wall of SGU-1.

The following table lists properties of a typical package water tube boiler according to the invention, as shipped by truck or railcar:

| Property | Value |
|---|---|
| Length, SGU-1, exterior | 400.375 in. |
| Length, SGU-2, exterior | 400.375 in. |
| Length, connecting duct | 108 in. |
| Height, SGU-1, exterior | 178 in. |
| Height, SGU-2, exterior | 196 in. |
| Distance between mud and steam drum axes, SGU-1 | 146.75 in. |
| Distance between mud and steam drum axes, SGU-2 | 146.75 in. |
| Width, SGU-1, exterior | 150 in. |
| Width, SGU-2, exterior | 150 in. |
| Width, furnace, internal | 138.5 |
| Weight, SGU-1 | approx. 90,000 lbs |
| Weight, SGU-2 | approx. 157,000 lbs |
| Capacity, gross (saturated steam) | 250,000 lbs/hr |
| Pressure, design, boiler | 250 psig |
| Pressure, operating, at drum outlet | 200 psig (saturated) |
| Pressure, steam, at boiler outlet | 388 deg F. (saturated) |
| Volume, furnace, internal | 3250 cu. ft. |
| Surface area, radiant heating | 1,301 sq. ft. |
| Surface area, convection heating | 10,127 sq. ft. |
| Surface area, total effective | 14,678 sq. ft. |
| Temperature, feedwater to boiler | 228 deg. F. |

The following table lists the reference characters used herein the names of components and features they designate:

| Reference Character | Component or features |
|---|---|
| SGU-1 | 12 |
| SGU-2 | 14 |
| SGU-connecting duct | 16 |
| expansion joint | 17 |
| burner | 18 |
| combustion air fan | 20 |
| combustion air duct | 22 |
| economizer | 24 |
| flue gas recirculation duct | 26 |
| SGU-1 mud drums | 30 |
| SGU-1 steam drum | 32 |
| SGU-1 radiant riser tubes | 34 |
| combustion chamber | 36 |
| SGU-1 membrane wall | 38 |
| SGU-1 front end wall | 40 |
| burner collar | 41 |
| fuel inlet pipe | 42 |
| SGU-1 rear end wall | 44 |
| SGU-1 rear end wall passage | 46 |
| SGU-2 mud drums | 60 |
| SGU-2 steam drum | 62 |
| SGU-2 convection riser tubes | 64 |
| SGU-2 downcomer tubes | 65 |
| SGU-2 membrane wall | 66 |
| SGU-2 front end wall | 68 |
| SGU-2 front end wall passage | 69 |
| SGU-2 rear end wall | 70 |
| feedwater inlet | 72 |
| saturated steam delivery point | 74 |
| first inter-SGU piping (water transfer from SGU-2 mud drums to SGU-1 mud drums) | 90 |
| second inter-SGU piping (water transfer from lower portion of SGU-2 steam drum to lower portion of SGU-1 steam drum) | 92 |
| third inter-SGU piping (steam transfer from upper portion of SGU-1 steam drum to upper portion of SGU-2 steam drum) | 94 |
| fourth inter-SGU piping (downcomer from lower portion of SGU-2 steam drum to SGU-1 mud drum) | 96 |
| superheater | 100 |
| SGU-connecting duct | 102 |
| saturated steam piping | 104 |
| superheated steam delivery point | 106 |
| superheater tubes | 108 |
| superheater lower headers | 110 |
| superheater upper header | 112 |
| superheater riser tubes | 114 |
| U-shaped SGU-connecting duct | 120 |

It will be understood that, while presently preferred embodiments of the invention have been illustrated and described, the invention is not limited thereto, but may be otherwise variously embodied within the scope of the following claims. It will also be understood that the method claims are not intended to be limited to the particular sequence in which the method steps are listed therein, unless specifically stated therein or required by description set forth in the steps.

The invention claimed is:

1. A natural circulation water tube package boiler having a plurality of self-contained steam generating units in tandem, which package boiler comprises
   (a) a first SGU having
      (i) an enclosure formed by bottom, top, and opposed side walls joined horizontally along their longest dimension to form four sides of a rectangular parallelepiped having a horizontal longitudinal axis and the general proportions of a boxcar;
      (ii) a cylindrical mud drum located within the enclosure near the bottom wall and having its longitudinal axis parallel to the longitudinal axis of the enclosure;
      (iii) a cylindrical steam drum located within the enclosure near the top wall and having its longitudinal axis parallel to the longitudinal axis of the enclosure, which steam drum contains equipment for separating steam from water;
      (iv) riser tubes connecting the mud drum to the steam drum so as to permit water, saturated steam, and mixtures thereof to flow from the mud drum to the steam drum, which riser tubes are radiant tubes;
      (v) an entrance opening for fuel and air;
      (vi) a combustion chamber located generally between the drums and defined by the radiant tubes which surround it and are connected to each other by fins to form membrane walls extending along, joined to, and supporting the side walls in a hollow parallelepiped array;
      (vii) a large rear opening for combustion gases to exit, which opening is perpendicular to said horizontal longitudinal axis; and
      (viii) no convection tubes;
   (b) a second SGU having
      (i) an enclosure formed by bottom, top, and opposed side walls joined horizontally along their longest dimension to form four sides of a rectangular parallelepiped having a horizontal longitudinal axis and the general proportions of a boxcar;
      (ii) a cylindrical mud drum located within the enclosure near the bottom wall and having its longitudinal axis parallel to the longitudinal axis of the enclosure;
      (iii) a cylindrical steam drum located within the enclosure near the top wall and having its longitudinal axis parallel to the longitudinal axis of the enclosure, which steam drum contains equipment for separating steam from water;

(iv) riser tubes connecting the mud drum to the steam drum so as to permit water, saturated steam, and mixtures thereof to flow from the mud drum to the steam drum, which riser tubes are convection tubes in a forest-like array throughout the second SGU, with the outermost convection tubes connected to each other by fins to form membrane walls extending along, joined to, and supporting the side walls;

(v) a large front opening for combustion gases to enter, which opening is perpendicular to said horizontal longitudinal axis;

(vi) a large rear opening for combustion gases to exit; and (vii) no combustion chamber;

(c) a large SGU-connecting duct connecting the rear of the first SGU to the front of the second SGU so that the two SGUs are in tandem;

(d) first inter-SGU piping connecting said mud drums for transferring water heated by the mud drum of the second SGU to the mud drum of the first SGU;

(e) second inter-SGU piping connecting said steam drums for transferring water from the lower portion of the steam drum of the second SGU to the lower portion of the steam drum of the first SGU;

(f) third inter-SGU piping connecting said steam drums for transferring steam from the upper portion of the steam drum of the first SGU to the upper portion of the steam drum of the second SGU; and (g) fourth inter-SGU piping connecting the rear, lower portion of the steam drum of the second SGU and the mud drum of the first SGU, for transferring water from that steam drum downwardly to that mud drum;

wherein the membrane walls of the SGUs and the SGU-connecting duct define a flow path for combustion gases which extends from the combustion chamber of the first SGU within the perimeter of the radiant tubes, through the SGU-connecting duct, and through the second SGU around the convection tubes in the forest-like array, and then through the exit opening, without making a U-turn within either SGU.

2. A package boiler according to claim 1 wherein the entrance opening is shaped and sized to receive a natural gas- or oil-fired burner for creating a horizontal flame in the combustion chamber.

3. A package boiler according to claim 1 wherein the width of the flow path in the second SGU is the distance between upwardly extending portions of the opposed membrane walls.

4. A package boiler according to claim 1 wherein the second SGU has downcomer tubes at the rear of the SGU, which downcomer tubes connect its steam drum and its mud drum so as to permit water to flow from the steam drum downwardly to the mud drum.

5. A package boiler according to claim 1 wherein the combustion chamber has an internal volume that exceeds 2,940 cu. ft.

6. A package boiler according to claim 1 wherein the diameter of the steam drum of the first SGU is substantially less than the diameter of the steam drum of the second SGU, and wherein the radiant tubes of the first SGU are longer than the convection tubes of the second SGU.

7. A package boiler according to claim 1 wherein the SGU-connecting duct contains a superheater connected to the steam drum of SGU-1 so as to receive saturated steam therefrom, so that SGU-1, the SGU connecting duct, and SGU-2 are in tandem.

8. A method of making a package boiler according to claim 1, which method comprises
 (a) providing said first steam generating unit at a factory in which it was manufactured and transporting it on a truck or a railcar to an operating site;
 (b) providing said second steam generating unit at a factory in which it was manufactured and transporting it on a truck or a railcar to said operating site;
 (c) providing said large SGU-connecting duct and connecting it at said operating site to the rear of the first steam generating unit and the front of said second SGU;
 (d) providing said inter-SGU piping and connecting it at said operating site to said mud drums and said steam drums.

9. A method of making a package boiler according to claim 8 wherein the first steam generating unit is transported by truck and the second steam generating unit is transported by railcar.

* * * * *